(12) United States Patent
Chi et al.

(10) Patent No.: US 11,432,378 B2
(45) Date of Patent: Aug. 30, 2022

(54) PLANAR HEATING STRUCTURE

(71) Applicant: Cambrios Film Solutions Corporation, Tortola (VG)

(72) Inventors: Ho-Hsun Chi, Hsinchu County (TW); Ying-Che Chen, New Taipei (TW); Yu Zhang, Fujian (CN); Hebo Yang, Fujian (CN); Fu-Yu Su, New Taipei (TW); Chao Gao, Xingcheng (CN); Shu-Guang Zhu, Fujian (CN); Chun-Ya Tang, Xiamen (CN); Wen-Da Chen, Zhangzhou (CN)

(73) Assignee: Cambrios Film Solutions Corporation, Tortola (VG)

( * ) Notice: Subject to any disclaimer, the term of this patent is extended or adjusted under 35 U.S.C. 154(b) by 293 days.

(21) Appl. No.: 16/580,357

(22) Filed: Sep. 24, 2019

(65) Prior Publication Data

US 2020/0037401 A1 Jan. 30, 2020

Related U.S. Application Data

(63) Continuation of application No. PCT/CN2018/080257, filed on Mar. 23, 2018.

(30) Foreign Application Priority Data

Mar. 24, 2017 (CN) .......................... 201710183435.8

(51) Int. Cl.
*H05B 3/86* (2006.01)
*B60S 1/02* (2006.01)
*B60S 1/58* (2006.01)

(52) U.S. Cl.
CPC ................ *H05B 3/86* (2013.01); *B60S 1/026* (2013.01); *B60S 1/586* (2013.01)

(58) Field of Classification Search
CPC . H05B 3/86; H05B 3/06; H05B 3/845; H05B 3/10; H05B 3/20; H05B 2203/013;
(Continued)

(56) References Cited

U.S. PATENT DOCUMENTS 9,061,481 B2 6/2015 Varaprasad et al.
2010/0059495 A1* 3/2010 D'Haene ........... B32B 17/10761
219/203

(Continued)

FOREIGN PATENT DOCUMENTS

CN 104053256 A 9/2014
CN 104616837 A 5/2015
(Continued)

OTHER PUBLICATIONS

International Search Report and Written Opinion with English Translation of ISR, cited in PCT/CN2018/080257 dated Jun. 28, 2018, 9 pages.

*Primary Examiner* — Shawntina T Fuqua
(74) *Attorney, Agent, or Firm* — Cooper Legal Group, LLC

(57) ABSTRACT

A planar heating structure is disclosed. The planar heating structure includes a glass substrate layer, a nanometallic transparent conductive layer, and a first passivation layer. The nanometallic transparent conductive layer is disposed on the glass substrate layer and receives a voltage to generate heat energy. The first passivation layer is disposed on the nanometallic transparent conductive layer and completely covers the nanometallic transparent conductive layer.

20 Claims, 4 Drawing Sheets

(58) Field of Classification Search
CPC ...... H05B 2214/04; B60S 1/026; B60S 1/586; B60J 1/002
See application file for complete search history.

(56) References Cited

U.S. PATENT DOCUMENTS

2015/0076137 A1* 3/2015 Kim .................. H05B 3/20
219/553
2016/0198527 A1 7/2016 Park

FOREIGN PATENT DOCUMENTS

| | | | |
|---|---|---|---|
| CN | 104992752 | A | 10/2015 |
| CN | 105981473 | A | 9/2016 |
| CN | 106448824 | A | 2/2017 |
| CN | 106457774 | A | 2/2017 |
| CN | 106465478 | A | 2/2017 |
| JP | S62-000459 | U | 1/1987 |
| JP | S62459 | A | 1/1987 |
| JP | 04092397 | U | 8/1992 |
| JP | H04-092397 | U | 8/1992 |
| JP | 2009505358 | A | 2/2009 |
| JP | 2010103041 | A | 5/2010 |
| JP | 2011090878 | A | 5/2011 |
| JP | 2016515280 | A | 5/2016 |
| JP | 2016119305 | A | 6/2016 |
| WO | 2015189890 | A1 | 12/2015 |
| WO | 2016108656 | A1 | 7/2016 |

* cited by examiner

PLANAR HEATING STRUCTURE

RELATED APPLICATIONS

This application is a continuation of and claims priority to International Patent Application Serial Number PCT/CN2018/080257, filed on Mar. 23, 2018, which claims priority to China Application Serial Number 201710183435.8, filed on Mar. 24, 2017. International Patent Application Serial Number PCT/CN2018/080257 and China Application Serial Number 201710183435.8 are hereby incorporated by reference.

BACKGROUND

Field of Disclosure

The present disclosure relates to a planar heating structure. More particularly, the present disclosure relates to a planar heating structure having a high light transmittance and uniform heating.

Description of Related Art

In order to ensure clarity and breadth of drivers' angles of sight, the automotive industry is faced with various problems caused by climate. One of them is the moisture condensation problem on the front and rear windshields of automobiles caused by the temperature differential between the insides and outsides of the automobiles. The moisture condensed on the front and rear windshields of automobiles thus generates the so-called window fog phenomenon. This phenomenon will obviously and significantly reduce the visibility through the front and rear windshields, thus seriously degrading the drivers' angles of sight and visual abilities.

In addition, in a low temperature environment, how to remove the accumulated snow frost on the vehicle windows has been one of the long-standing issues discussed. Owing to the hard frost formed along the entire glass surfaces or the old snow layers that are dissolved and then refrozen, the drivers need to stay outside the automobiles for a long time to remove the hard snow frost in bitter cold with the risk of damaging the windows.

In order to resolve the above window fog/frost problem, there are two main types of technology that have been developed. One of them is anti-fog/frost, while the other is defogging/defrosting. In the defogging/defrosting technology, the mainstream implementation method is distributing metal wires on surfaces of the window glass and applying a current. Under the circumstances that no active or passive electronic element consumes energy, the metal wires distributed on the window surfaces will heat up because of energy conversion so that the temperature of the window glass surrounding the areas on which the metal wires are attached also rises, which in turn resolves the fog phenomenon by increasing the overall window glass temperature. One of the technologies that has been used for years is Ford's Quickclear, which embeds metal heating wires between two layers of glass. However, this method in which metal wires are used to raise temperature so as to remove fog/snow has a considerable number of problems and disadvantages.

First, the combination of metal wires and glass surfaces is not easy. Defects caused by incomplete attachment frequently occur or one part is attached but another part falls off, so that the glass attached with the same wire generates non-uniform heat. The defogging/defrosting effect is influenced or the glass is damaged when the situation is serious.

Additionally, since the metal wires are not transparent, only the rear window glass can utilize this technology but the front windshields and glass on sides of the automobiles can not use this technology to defrost. In addition to that, the width of the metal wires needs to be controlled and a wire spacing also needs to be maintained at a considerable distance to retain the visibility through the windows. Therefore, a same piece of window glass tends to generate a temperature differential owing to non-uniform heating depending on the distance from the metal wire. As a result, fog/frost in some part is removed but fog/frost at dead corners still exists.

When the metal wire itself has a poor contact or when the metal wire and an external power supply contact are poorly contacted, the heating wire after a break point will lose its functionality for lack of energy as long as the break point is close to the power supply. As such, the reliability of this type of technology is not high and abnormity easily occurs. When abnormity occurs, the only way to repair this is to replace the whole window glass, because the heating wire is buried between the two layers of glass and tightly stuck. The cost is too high, thus seriously affecting the penetration rate.

In addition, the technology that uses heating wires to defog/defrost needs to wait for the metal wires to slowly heat up. Especially when the climate is cold or overly wet, it is necessary to wait for a longer time before fog/glazed frost is removed. When the driver is anxious to start and drive the automobile, the aid is too slow in coming to be of any help. If the driver does not want to wait and insists on driving, the problem of dangerous driving is brought forth. Not only is the driver affected, but the overall road safety also can not be ensured.

For the foregoing reasons, there is a need to solve the problems including non-uniform heating, insufficient transparency, and a long time to wait, by providing a planar heating structure, which is also an objective that the industry is eager to achieve.

SUMMARY

The present disclosure provides a planar heating structure that can uniformly heat a target, and has excellent transparency and can raise the temperature to a default temperature quickly.

A planar heating structure is provided. The planar heating structure comprises a glass substrate layer, a nanometallic transparent conductive layer, and a first passivation layer. The nanometallic transparent conductive layer is disposed on the glass substrate layer and receives a voltage to generate heat energy. The first passivation layer is disposed on the nanometallic transparent conductive layer and completely covers the nanometallic transparent conductive layer.

The disclosure provides a planar heating structure for bonding to glass. The planar heating structure comprises a flexible substrate layer, a nanometallic transparent conductive layer, an adhesive layer, and a release film. The nanometallic transparent conductive layer is disposed on the flexible substrate layer and receives a voltage to generate heat energy. The adhesive layer is disposed on the nanometallic transparent conductive layer. The release film is formed on a surface of the adhesive layer away from the nanometallic transparent conductive layer.

In the foregoing, the planar heating structure further comprises a second passivation layer disposed between the glass substrate layer or the flexible substrate layer and the nanometallic transparent conductive layer.

In the foregoing, the second passivation layer is an optical functional layer.

In the foregoing, the optical functional layer is any of an anti-reflection layer and an anti-UV layer, or a combination thereof.

In the foregoing, a material of the glass substrate layer or the flexible substrate layer is transparent glass or a flexible transparent film.

In the foregoing, a material of the nanometallic transparent conductive layer is a silver nano material.

DESCRIPTION OF THE EMBODIMENTS

Figure 1:
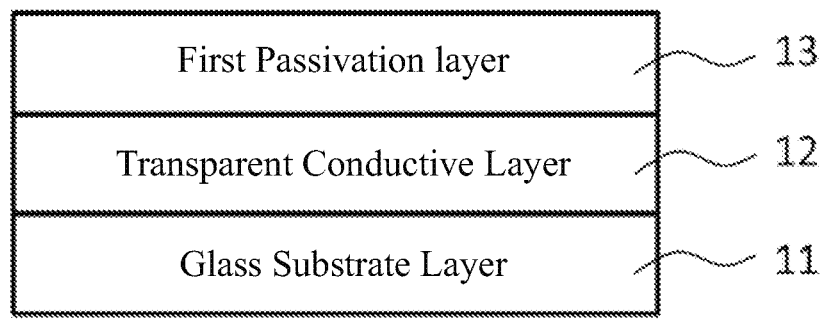
FIG. 1 depicts a schematic diagram of a planar heating structure according to one embodiment of this disclosure.

The following description of the planar heating structure will be provided with reference to certain embodiments, and those skilled in the art will readily appreciate the other advantages and effects of the teachings as disclosed in this specification. The present disclosure may also be implemented or applied by other embodiments. Details in this specification may be based on different views and applications, and various modifications and variations can be made to the present disclosure without departing from the scope or spirit of the disclosure. In addition, drawings are only for the purpose of illustration and not plotted according to the original size, thickness, and scale, that is, do not reflect the actual dimension of relevant constituent.

Reference will now be made in detail to the present embodiments of the disclosure, examples of which are illustrated in the accompanying drawings. Wherever possible, the same reference numbers are used in the drawings and the description to refer to the same or like parts. In addition, drawings of all the embodiments of the disclosure are schematic and do not represent the actual size and scale. Additionally, "above" and "lower" as used in the context of the following embodiments are merely used to denote relative positional relationships. Furthermore, the formation of one feature "over", "on", or "below" another feature in the description that follows include embodiments in which the one and another features are formed in direct contact, and may also include embodiments in which additional features may be formed between the one and another features, such that the one and another features may not be in direct contact.

A description is provided with reference to FIG. 1. FIG. 1 depicts a schematic diagram of a planar heating structure 1 according to one embodiment of this disclosure. The planar heating structure 1 can be used for heating various transparent substrates to achieve the defogging/defrosting effect. For example, the planar heating structure 1 is applied to front and rear windshields, side window glass, and side mirrors of automobiles, or applied to glass refrigerators for business use, or applied to heating fish tanks.

The planar heating structure 1 comprises a glass substrate layer 11, a transparent conductive layer 12, and a first passivation layer 13. The glass substrate layer 11 is a substrate that constitutes a transparent part of a vehicle window, and may be any material having an appropriate transparency and sufficient strength to pass the automotive safety specification. The glass substrate layer 11 may be but not limited to high strength heat-resistant glass or plastic, but the present disclosure is not limited in this regard. In addition, the glass substrate layer 11 may be a composite structure of glass and plastic.

The transparent conductive layer 12 is disposed on the glass substrate layer 11, and is able to receive electrical energy to raise a temperature of the planar heating structure 1. For example, after receiving a voltage, a current flowing from a high potential to a low potential is generated in the transparent conductive layer 12. Since there is no active circuit in the transparent conductive layer 12, the electrical energy is consumed through raising a temperature of the transparent conductive layer 12 to achieve a balance. This increased heat energy is evenly conducted to the glass substrate layer 11. In this manner, the effect of heating up the glass substrate layer 11 is achieved according to the present disclosure so that the glass substrate layer 11 of the vehicle window can defog.

In one embodiment, the transparent conductive layer 12 is composed of distributed nanometallic materials. In at least on embodiment, the nanometallic material may be a silver nano material with better metal properties and at the same time retaining sufficient light transparency. As a result, while the present disclosure is able to defog the window, the transparency of the vehicle window can be ensured to satisfy the national standards for use of cars from various countries. For example, as used herein, "nanometallic material" refers to a metal wire comprising a metal element, a metal alloy, or a metal compound (including a metal oxide). At least one cross-sectional dimension of a metal nanowire is less than 500 nanometers (nms), preferably less than 100 nm, more preferably less than 50 nm, and more typically less than 100 nm or 50 nm. In various embodiments, a width or an equivalent diameter of a nanostructure is in a range of 10 nm to 40 nm, between 20 nm and 40 nm, between 5 nm and 20 nm, between 10 nm and 30 nm, between 40 nm and 60 nm, or between 50 nm and 70 nm. An aspect ratio (length:width) of the metal nanowires is higher than 10, preferably higher than 50, and more preferably higher than 100. The nanowires having appropriate working properties typically have an aspect ratio in a range of 10 to 100,000. A higher aspect ratio is more advantageous for obtaining a transparent conductor layer. It is because that this feature allows for the transparent conductive layer 12 to form a more efficient conductive network and at the same time allows an overall density of the conductive nanowires to be reduced to achieve high transparency. In other words, in order to achieve a set transparency, a density of nanowires of the conductive network does not need to be overly high when a conductive nanowire having a higher aspect ratio is used. The conductive network is thus substantially close to transparent. The metal nanowires may be dominated by any metal, which includes (but not limited to) silver, gold, copper, nickel, and gold and silver plating.

Figure 2A:
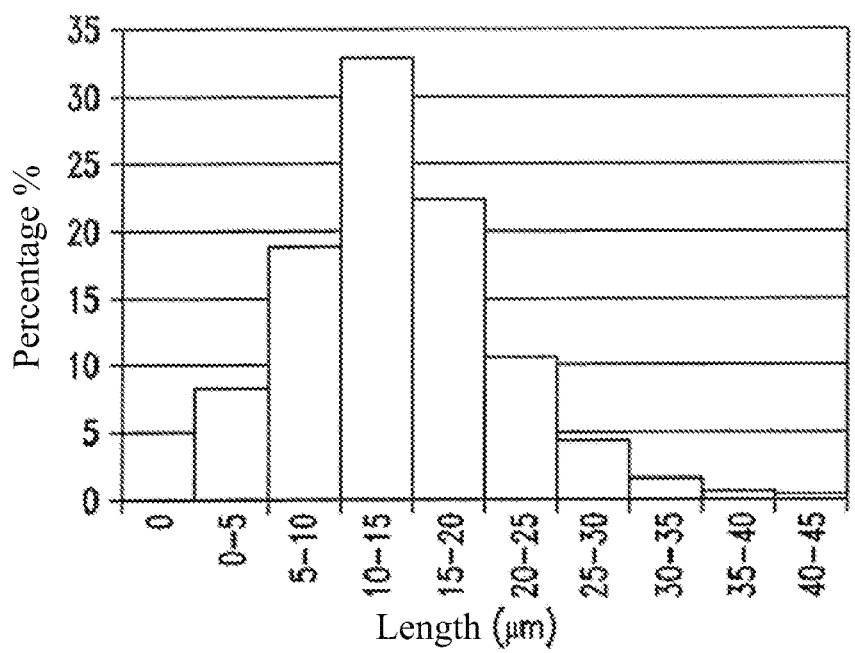
FIG. 2A depicts a histogram of lengths of purified metal nanowires according to one embodiment of this disclosure.

A ratio of a length to a diameter of the metal nanowire is also related to whether the conductive properties of the transparent conductive layer are excellent. In various embodiments, a length of a nanowire structure is in a range of 5 μm to 30 μm, or in a range of 15 μm to 50 μm, between 25 μm and 75 μm, between 30 μm and 60 μm, between 40 μm and 80 μm, or between 50 μm and 100 μm. As shown in FIG. 2A, which depicts a histogram of lengths of purified metal nanowires according to one embodiment of this disclosure. In the present embodiment, more than 80% of the metal nanowires have a length of less than 25 μm, more than 75% of the metal nanowires have a length greater than 8 μm, and more than 92% of the metal nanowires have a length greater than 5 μm. Since other possible combinations have been disclosed in the figure and may be referred to the figure, a description in this regard is not provided.

The aforementioned "transparent conductive layer" refers to a network layer of metal nanowires that provides a conductive medium of a transparent conductor. When a matrix is present, a combination of the network layer of metal nanowire and the matrix is also referred to as a "transparent conductive layer". Since conductivity is achieved by electrical charge percolation from one metal nanowire to another metal nanowire, there must be sufficient metal nanowires in the conductive layer to reach an electrical percolation threshold and become conductive. A surface conductivity of the conductive layer is inversely proportional to its surface resistivity, and the surface resistivity is sometimes referred to as sheet resistance, which can be measured by methods known in the art. In the present embodiment, the matrix layer is a part of the transparent conductive layer and is disposed on the glass substrate layer 11.

Those skilled in the art will appreciate that mechanical and optical properties of the matrix are likely to be altered or compromised by a high loading of any of the particles in it. Advantageously, when the aspect ratio of the metal nanowires is high enough, an allowable threshold loading level of silver nanowires is a conductive network formed by a 35% matrix by weight. This loading level does not affect the mechanical or optical properties of the matrix.

In various embodiments, the metal nanowires may be at a loading level higher than the threshold loading level without adversely affecting the mechanical or optical properties of the matrix. For example, silver nanowires may typically be at a loading level lower than about 60% by weight, more typically lower than about 40% by weight, and most typically lower than about 20% by weight, and even more typically lower than about 10% by weight. These values completely depend on a dimension and a spatial distribution of the nanowires. Advantageously, a transparent conductor of tunable electrical conductivity (or surface resistivity) and transparency can be provided by adjusting the loading level of the metal nanowires. As will be appreciated by those skilled in the art, the mechanical and optical properties of the matrix are likely to be altered or damaged by the high loading of any of the particles in it. Advantageously, the high aspect ratio of the metal nanowires allows for the formation of a conductive network through the matrix at a threshold surface loading level preferably of about 0.05 μg/cm² to about 10 μg/cm², more preferably from about 0.1 μg/cm² to about 5 μg/cm², and most preferably from about 0.8 μg/cm² to about 3 μg/cm² for silver nanowires. These surface loading levels do not affect the mechanical or optical properties of the matrix. The above values strongly depend on the dimension and spatial distribution of the nanowires. Advantageously, a transparent conductor of tunable electrical conductivity (or surface resistivity) and transparency can be provided by adjusting the loading level of the metal nanowires. In some embodiments, a thickness of the matrix is from about 10 nm to about 5 μm, from about 20 nm to about 1 μm, or from about 50 nm to about 200 nm. In other embodiments, a refractive index of the matrix is from about 1.3 to 2.5 or from about 1.35 to 1.8.

Typically, the optical transparence (transparency) or clarity of the transparent conductor can be quantitatively defined by parameters including light transmission and haze. "Light transmission" (or "light transmissivity") refers to the percentage of incident light transmitted through a medium. In various embodiments, the light transmission of the transparent conductor is at least 50%, at least 60%, at least 70%, or at least 80%, and may be as high as at least 91% to 92%. Haze is an index of light diffusion. It refers to the percentage of the quantity of light separated from the incident light and scattered during transmission. Unlike light transmission, which is mainly a property of the medium, haze is usually related to a product and is usually caused by surface roughness and embedded particles or compositional heterogeneities in the medium. In various embodiments, the haze of the transparent conductor is not more than 10%, not more than 8%, or not more than 5%, and may be as low as not more than 2% to 0.5%.

In one embodiment, when a width of the silver nanowires is from about 70 nm to about 80 nm and a length is about 8 μm, a bare silver nanowire film on PET has a light transmittance of more than 80%.

Additionally, in at least one embodiment, the experiment shows that the overall planar heating structure 1 can achieve a condition where a light transmittance is more than 85% and haze is less than 3%. At the same time, a resistance of the transparent conductive layer 12 is less than or equal to ten ohms per square centimeter.

As for an anti-UV agent, light-sensitive substances tend to absorb light and undergo or cause complex photochemical activities. One type of photochemical activity involves the excitation of a compound from the ground state to a higher energy level (that is, an excited state). The excited state is transient and will usually decay back to the ground state and releases heat. However, the transient excited state can also cause complex cascade reactions with some other substances. No matter what the failure mechanism is, it is found that certain photochemical activities result in corrosion of silver nanostructures through oxidation:

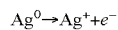

$$Ag^0 \rightarrow Ag^+ + e^-$$

In some embodiments, corrosion is suppressed by inhibiting the photochemical activities of the excited state or helping to quickly return to ground state. In greater detail, the adding of one or more light stabilizers into an optical stack (for example, incorporated into one or more layers, especially incorporated into one or more layers adjacent to the silver nanostructure) can suppress the photochemical activities that can probably cause silver corrosion.

An anti-UV layer comprises one or more anti-UV substances that absorb photons in the UV region (typically defined as light whose wavelength is less than 390 nm) so as to block or significantly attenuate the UV light in the incident light that originally can enter into the optical stack and degrade the silver nanostructures. The anti-UV substances are typically compounds having unsaturated chemical bonds. Generally speaking, when the anti-UV substances absorb photons, electronic excited states are generated. The excited states return to the ground states by way of energy transfer or electron transfer, thus dissipating photon energy.

In some embodiments, the anti-UV layer may be any of the substrates coated with a thin layer of anti-UV substance described herein. In other embodiments, the anti-UV layer may be implemented by incorporating one or more anti-UV substances in a major part of the layer. In another embodiment, especially in a configuration where the anti-UV layer is an intermediate layer within the optical stack, the anti-UV layer can suitably act as an optical clear adhesive (OCA) layer. Under the circumstances, the anti-UV OCA layer are used for both blocking the UV light and bonding two sub-portions of the optical stack.

The anti-UV agent that constitutes the anti-UV layer may be any of the following compounds: in general, it is non-volatile (has a boiling point of at least 150° C.) and may be a liquid or a solid. It may be a small organic molecule having a molecular weight of not more than 500, an oligomer having 2 to 100 monomers, or a polymer having more than 100 monomers.

Olefin contains an alkyl with at least one carbon-carbon double bond. The double bond makes the olefin a candidate for a sacrificial oxidation reaction. The olefin may have a linear chain, a cyclic carbon skeleton, or a combination of a linear chain and a cyclic carbon skeleton. As for the carbon skeleton, the olefin may be further substituted with a hydroxy, an alkoxy, a thiol, a halogen, a phenyl, or an amine group.

In one embodiment, a suitable olefin has a configuration with alternating double bonds and single bonds to provide an extended conjugated structure. The conjugated structure allows for the group to be delocalized so as to stabilize it. Examples of conjugated olefin include (but not limited to) carotenes or carotenoids, certain terpenes or terpenoids.

In other embodiments, olefin may have multiple non-conjugated double bonds. Examples of non-conjugated olefin include certain terpenes, rosins, polybutadiene, and the like. In addition to being a light stabilizer, some olefins are also tackifiers and can be directly incorporated into OCA.

Terpenes are a subgroup of olefin. They are originated from a variety of plants, especially resins made from conifers. Although terpenes comprise a wide variety of hydrocarbons, they all comprise at least one isoprene unit. Terpene may have a cyclic and a non-cyclic carbon skeletons. As used herein, "terpenes" also comprises terpenoids, which are derivatives of terpenes through oxidation or rearrangement of carbon skeletons.

In some embodiments, the light stabilizer is limonene. Limonene contains a cyclic terpene comprising two isoprene units. Cyclic double bonds are susceptible to oxidation reactions to form epoxides. Some metals can be used as inorganic light stabilizers because they can desensitize photochemical activities. Examples include a rhodium salt, zinc, or a cadmium salt. All these related patents are hereby incorporated by reference in their entirety.

An antioxidant is particularly effective in suppressing oxygen induced corrosion. The antioxidant can act as a trapping agent to remove oxygen by direct reaction with molecular oxygen. The antioxidant can also act to remove the groups formed in the initial oxidation reaction so as to prevent the chain reactions initiated by the other groups. In at least one embodiment, the antioxidant is ascorbate, which may be an ascorbate salt (such as a sodium ascorbic salt or a potassium ascorbic salt) or an ascorbic acid.

Other examples of the antioxidant may comprise thiol, hydrazine, and sulfate (such as sodium sulfite and potassium sulfite). The light stabilizer or combinations of any of the light stabilizers described herein may be incorporated into any of the layers of the optical stack.

In greater detail, since most of the functional layers of the optical stack can be formed by using a solution-based coating method, the light stabilizer can be combined with the coating solution before coating. For example, the light stabilizer may be incorporated into the nanostructured layer, the overcoat layer, the undercoat layer, the substrate, or the adhesive layer (such as OCA) through co-deposition.

The transparent conductive layer 12 may be disposed on one surface of the glass substrate layer 11 by utilizing a coating method, and the coating method may be, for example, spin coating, dipping, pouring, infusion, spraying, misting, blade coating, brushing, or printing, such as inkjet printing, screen printing, gravure printing, lithography, or pad printing, etc.

In order to provide sufficient and evenly distributed electrical energy to the transparent conductive layer 12, the present disclosure discloses a plurality of methods for generating electrodes or a current-feeding layer having a voltage differential. For example, a two-electrode layout may be formed between two sides of the transparent conductive layer 12 having a shortest linear distance by utilizing fine metal wires. Or, the electrodes may be mainly formed by screen printing of silver paste, which can evenly supply a current passing through the transparent conductive layer 12 to achieve rapid and uniform heating and cooling. In addition, the electrodes formed by screen printing of silver paste are mainly implemented by using a method, such as screen printing, vapor deposition, sputtering, attaching, and the like, and the electrodes are arranged on a surface of the transparent conductive layer 12 opposite to the glass substrate layer 11. Or, the electrodes may be formed on the glass substrate layer 11, and then the transparent conductive layer 12 is formed on the electrodes or a conductive layer that forms the electrodes.

In other words, the electrodes are disposed on the transparent conductive layer 12 and separated from one another, and the electrical conductivity of the electrodes is higher than that of the transparent conductive layer 12. For example, a silver paste or a high-conductivity metal paste may be used. In practical applications, these pastes may be coated or printed on the transparent conductive layer 12. In at least one embodiment, the two electrodes may be respectively disposed on opposite sides of the transparent conductive layer 12. Of course, as required by particular applications, the two electrodes may be separated from each other and disposed on two adjacent sides of the transparent conductive layer 12. Or, one electrode occupies two adjacent sides. The above selection will affect the distribution of current on the transparent conductive layer 12 and the path of current flow, thus determining the distribution of energy consumption. As a result, the present disclosure can evenly heat the target surface and can individually heat a special area to overcome the problem of uneven heating of the transparent conductive layer 12 owing to uniform coating. A detailed description is provided as follows. It is noted that "electrodes" referred to in the present disclosure are not limited to a layered structure. In practical applications, the layered structure may be substituted with a fine metal wire having a high conductivity depending on needs.

It is noted that, in other embodiments, the transparent conductive layer 12 may be directly formed on a surface of the glass substrate layer 11 by using a coating or printing method, and the electrodes are then coated or printed on the transparent conductive layer 12.

In addition, it is noted that in practical applications an area of a front windshield of an automobile is larger, and therefore the heating temperature of the entire glass is probably non-uniform to cause a different regional defogging rate under the circumstance that a same nanometallic material is uniformly distributed over the transparent conductive layer 12. As a result, in at lest one embodiment, a cross-sectional area of the transparent conductive layer 12 adjacent to the nanometallic coating layer where the current is introduced can be made smaller and a cross-sectional area of the transparent conductive layer 12 far from the nanometallic coating layer where the current is introduced can be made larger to make the heating temperature of the entire glass uniform. The entire glass thus has a same defogging rate. Or, under the circumstances that the nanometallic materials are uniformly distributed in the transparent conductive layer 12, the transparent conductive layer 12 can be patterned by screen printing or etching to form various pattern layers, such as a dot, a polygon, interlaced lines, a concentric circle, or a circle-like arrangement. The principle is that a total area of portions of the transparent conductive layer close to the electrodes is reduced so as to be less than that of portions of the conductive layer located at a center portion away from the electrodes to average energy distribution. The planar heating structure can thus uniformly heat the target plane. Or, the heating capability for a specific area can be improved.

Furthermore, through controlling a pattern diameter, a density, a distribution, and the like of the transparent conductive layer 12, an overall light transmittance of the planar heating structure 1 can be further increased, thus satisfying the factory specifications for transparency of the vehicle window from various countries. The entire planar heating structure 1 is a transparent film, so it can be affixed to an inside of an automobile, such as a front or rear windshield, etc., without hindering a driver's sightline to achieve rapid and uniform heating.

Since the transparent conductive layer 12 disclosed by the present application is composed of the nanometallic material, the whole conductive layer has a conductive capability, and is not easy to generate break points as compared with Quickclear and similar technologies. Because the pattern is laid out all over the layer, an alternative conductive path can compensate for the defect of a single break point when the break point is generated. Therefore, a local defect does not cause the whole transparent conductive layer 12 to lose its working ability, which in turn significantly reduces the difficulty in manufacturing, increases the yield, and improves the product reliability.

Figure 2B:
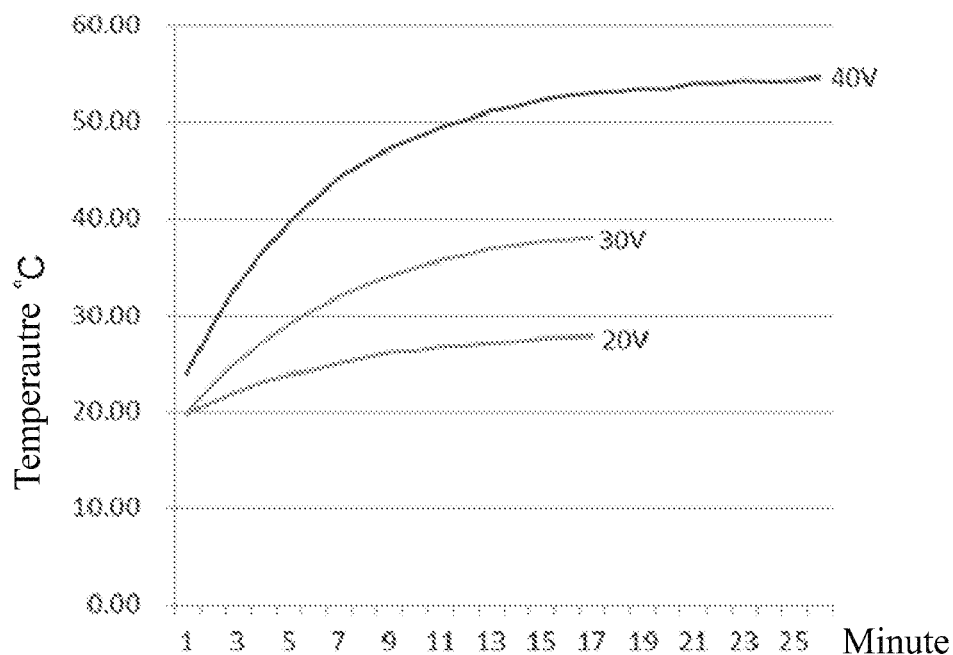
FIG. 2B depicts a schematic diagram showing a temperature rise by heating at various time points according to one embodiment of this disclosure.

With additional reference to FIG. 1, in the present embodiment, after the current is introduced into the transparent conductive layer 12 by the electrodes, a temperature of the transparent conductive layer 12 can be controllably raised to heat the glass substrate layer 11 on its side so as to effectively remove mist on an outer surface of the glass substrate layer 11 relative to the transparent conductive layer 12. In addition, since the transparent conductive layer 12 is bonded to the glass substrate layer 11 in such a manner that the transparent conductive layer 12 is in contact with an entire surface of the glass substrate layer 11, not only can the transparent conductive layer 12 quickly heat up the glass substrate layer 11, but the transparent conductive layer 12 can also allow the entire surface of the glass substrate layer 11 to uniformly raise temperature so that the entire surface is simultaneously defogged. A description is provided with reference to FIG. 2B. FIG. 2B depicts a schematic diagram showing a temperature rise by heating at various time points according to one embodiment of this disclosure. Take a practical data for example. A planar heating structure 12 according to one embodiment of the present disclosure, when being applied with a voltage of 40 volts and when per square centimeter of its surface area consumes a power of 0.07 W, can have a temperature rise of 12° C.±1° C. within 2 minutes. That is, the planar heating structure according to one embodiment of the present disclosure only requires a small amount of electricity to rapidly heat up the glass of automobile so as to achieve the defogging effect. As can be seen from FIG. 2B, raising the voltage properly is the key to raising the temperature efficiently. Although here the "40 volts" is taken as an example for illustration, power supply schemes of 20 volts and 30 volts and the corresponding data in the figure should not be excluded. In fact, all data disclosed in FIG. 2B shall be deemed to have been fully disclosed, and a description in this regard is not provided.

In addition, it is noted that whether the product is good or not is not simply determined by the efficiency of the temperature rise. The temperature rise data shown in FIG. 2B are obtained when it is ensured that the window glass maintains sufficient transparency and haze. For example, while the heating data of FIG. 2B are achieved, the planar heating structure 1 can achieve a condition where a transmittance is more than 85% and haze is less than 3%. At the same time, a resistance of the transparent conductive layer 12 is less than or equal to ten ohms per square centimeter.

When the transparent conductive layer 12 is disposed on the glass substrate layer 11, the first passivation layer 13 is disposed on a surface of the transparent conductive layer 12 and covers the surface of the transparent conductive layer 12. The first passivation layer 13 may be a transparent optical adhesive, or may be a coated transparent insulating material, or may be a previously formed passivation layer that is bonded to the transparent conductive layer 12 afterwards. Additionally, the first passivation layer 13 completely covers the transparent conductive layer 12 and the electrodes to provide the transparent conductive layer 12 and the electrodes with complete protection. Additionally, a thermal conductivity of the first passivation layer 13 is lower than that of the glass substrate layer 11, so in general the heat source can only be discharged from one side of the glass substrate layer 11 in a conductive or radiating manner to allow the planar heating structure 1 to rapidly and uniformly heat up.

Or, in an example where the electrodes are modularized and are electrically coupled to the planar heating structure 1 through the two sides of the transparent conductive layer 12, the first passivation layer 13 only completely covers the transparent conductive layer 12 to provide the transparent conductive layer 12 with complete protection.

In at least one embodiment, the first passivation layer 13 may be formed by using a polyvinyl butyral (PVB) film. The first passivation layer 13 is a hot melt adhesive film, and a material of the first passivation layer 13 may be selected to be a polyvinyl butyral (PVB) film or an ethylene vinyl acetate copolymer (EVA) film.

Figure 3:
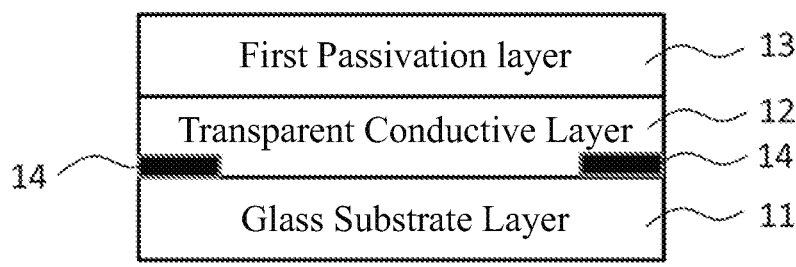
FIG. 3 depicts a schematic diagram of a structure of a planar heating structure 1 based on FIG. 1 according to another embodiment of this disclosure.

A description is provided with reference to FIG. 3. FIG. 3 is another embodiment based on FIG. 1. In the present embodiment, when the electrodes are non-transparent or lack of light transmittance, wirings of the electrodes are clearly visible and affect the visual effect of the vehicle window. In order to cover the electrodes formed on the two sides of the transparent conductive layer 12 or on sides, an ink layer 14 is disposed between the glass substrate layer 11 and the transparent conductive layer 12. Generally speaking, the ink layer 14 is distributed at positions where the electrodes are positioned so the ink layer 14 is only formed on the two sides or at edges of the transparent conductive layer 12 corresponding to the electrodes to increase the visibility of the planar heating structure 1.

Through the above description, functions and structures of the present embodiment has been fully disclosed. In addition to that, as can be seen from FIG. 1 and FIG. 3, two sides of the glass substrate layer 11, the two sides of the transparent conductive layer 12, and two sides of the first passivation layer 13 are all exposed to the air, and using environments of the automobile are likely very harsh. For example, the automobile is used in a high temperature environment, a high humidity environment, or even an atypical environment in which sulfur or the like exists to increase oxidation speed. In order to avoid the problems of rapid oxidation and deterioration of the transparent conductive layer 12 due to poor environmental conditions and also protect the glass substrate layer 11, a reinforcement adhesive material can be added to at least one side of the glass substrate layer 11, the transparent conductive layer 12, and the first passivation layer 13 for encapsulation in one embodiment. The reinforcement adhesive may be formed through solidification of a liquid adhesive by way of a curing process. The reinforcement adhesive has a viscosity of 500 to 1200 mPa·sec when uncured, and has a Shore hardness of 70 to 85 after curing.

Figure 4:
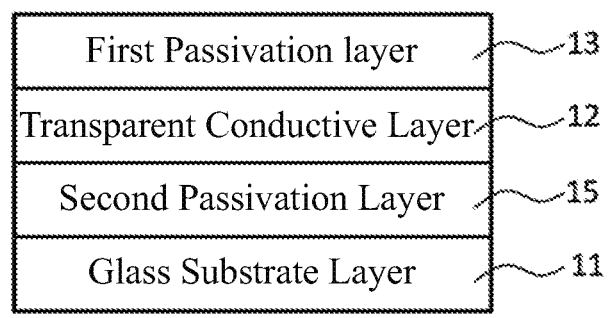
FIG. 4 depicts a schematic diagram of a structure of another planar heating structure 2 according to this disclosure.

A description is provided with reference to FIG. 4. FIG. 4 depicts a structural diagram of another planar heating structure 2 according to this disclosure. According to the present embodiment, the planar heating structure 2 comprises the glass substrate layer 11, the transparent conductive layer 12, and the first passivation layer 13, and a second passivation layer 15 is added. It is noted that the second passivation layer 15 is disposed between the glass substrate layer 11 and the transparent conductive layer 12 according to the present embodiment. The second passivation layer 15 is an optical functional layer having the anti-ultraviolet (UV) or/and anti-reflection abilities. The anti-UV function of the second passivation layer 15 reduces a total amount of UV light entering into the transparent conductive layer 12, thus extending the lifetime of the nano metal in the transparent conductive layer 12 and prolonging the period before entering into its deteriorated state. The anti-reflection function reduces the possibility of reflection of the transparent conductive layer 12 and the first passivation layer 13, thus increasing the overall transparency of the planar heating structure 2.

Additionally, in order to simplify the manufacturing processes to reduce the cost, particles or coating agents of an anti-reflection and/or anti-UV material may be mixed and coated in the transparent conductive layer 12 when the transparent conductive layer 12 is formed.

In summary, in the embodiments where the planar heating structures are disclosed in FIG. 1, FIG. 3, and FIG. 4, the heating structure is directly formed on the vehicle window to form an integrated structure. The advantage is that it is convenient for the plant production line. However, if the automobile in use needs to install the planar heating structure according to the present disclosure to defog/defrost or an original planar heating structure of the automobile in use needs to be replace with the planar heating structure according to the present disclosure to defog/defrost, or when technologies, such as Quickclear and the like, in which metal wires are encapsulated between two layers of structures have malfunctioned, the vehicle window also needs to be replaced, which results in waste of resources and is not economical. Hence, another embodiment is described as follows. In the following embodiment, the heating structure is independent of the window glass, and is bonded to the vehicle window thereafter by utilizing an adhesive to allow the vehicle window installed with the heating structure to rapidly and uniformly defog.

Figure 5A:
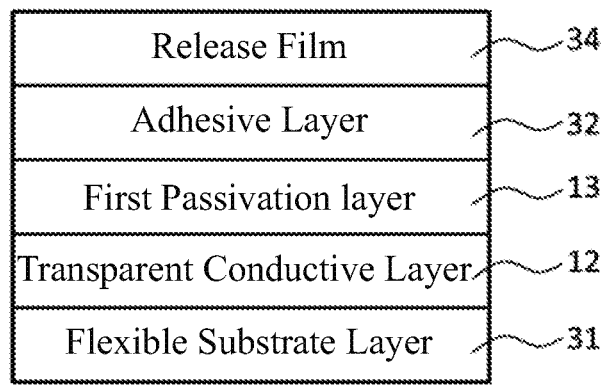
FIG. 5A depicts a schematic diagram of a structure of still another planar heating structure 3 according to this disclosure.

A description is provided with reference to FIG. 5A. FIG. 5A is a planar heating structure bonded to glass according to still another embodiment of this disclosure. A planar heating structure 3 comprises a flexible substrate layer 31, the transparent conductive layer 12, the first passivation layer 13, an adhesive layer 32, and a release film 34. In the present embodiment, the transparent conductive layer 12 is disposed on the flexible substrate layer 31. The transparent conductive layer 12 receives a voltage so as to generate heat energy by consuming electrical energy. As for the material selection, the formation method, and the arrangement rule of the transparent conductive layer 12, reference may be made to the above disclosure of various features of the transparent conductive layer 12 and a description in this regard is not provided. The release film 34 is formed on a surface of the adhesive layer 32 away from the transparent conductive layer 12 for protecting and shielding the adhesive layer 32. Before the adhesive layer 32 is attached to the window glass, the release layer 34 is adhered to the adhesive layer so as to protect and shield the adhesive layer 32 and prevent the adhesive layer 32 from accidentally sticking and maintain its stickiness.

The flexible substrate layer 31 applied to the present embodiment needs to accommodate a larger amount of deformation to cope with the assembly mode of attaching. Hence, the material selection should mainly be a flexible film, and may be a composite forming body of transparent thin films to meet the requirements of strength and deformation amount at the same time. A material of a transparent flexible thin film may be selected from one of the following plastic materials, that is, selectable transparent materials such as polypropylene (PP), polyethylene (PE), polystyrene (PS), polymethyl methacrylate (PMMA), polycarbonate (PC), polyethylene terephthalate (PET), polyvinyl chloride (PVC), polyimide (PI), polyurethane (PU), etc., or any combination thereof. In addition, it is noted that since the flexible substrate layer 31 is exposed and in contact with a user in the automobile, the ability of wear resistance is required and, if necessary, the flexible substrate layer 31 can undergo a wear resistance treatment to improve the wear resistance and scratch proof ability of the substrate layer.

The adhesive layer 32 is formed or disposed on the transparent conductive layer 12. The adhesive layer 32 has a considerable adhesive ability and is used for smoothly and completely bonding the planar heating structure 3 to the vehicle window so that the planar heating structure 3 can uniformly heat the vehicle window and defog by using the above working principle. As for the selection of the adhesive layer 32, a universal adhesive layer for vehicle window may be selected, or an adhesive liquid or an adhesive may be coated on the vehicle window through subsequent processing or coating and followed by a bonding process. If the subsequent coating method is selected, the adhesive layer 32 may be omitted in the planar heating structure 3.

It is noted that, in order to allow the thermal energy generated by the planar heating structure 3 to be conveyed to the window glass without loss and maintaining the distribution as designed, the adhesive layer or adhesive must be selected to have a formula or to be a material having a smaller thermal resistance to avoid affecting the defogging effect of the planar heating structure 3.

In the present embodiment, the first passivation layer 13 is formed between the transparent conductive layer 12 and the adhesive layer 32, that is, on a surface of the transparent conductive layer 12 away from the flexible substrate layer 31. The first passivation layer 13 may be integrated with the adhesive layer 32 to form a first passivation layer having an adhesive ability. At the same time, the first passivation layer 13 may serve as an optical functional layer, which has the anti-UV and/or anti-reflection abilities and is added with a material that absorbs visible light and heat. Or, the first passivation layer 13 may be formed on another surface of the transparent conductive layer 12 close to the flexible substrate layer 31.

Figure 5B:
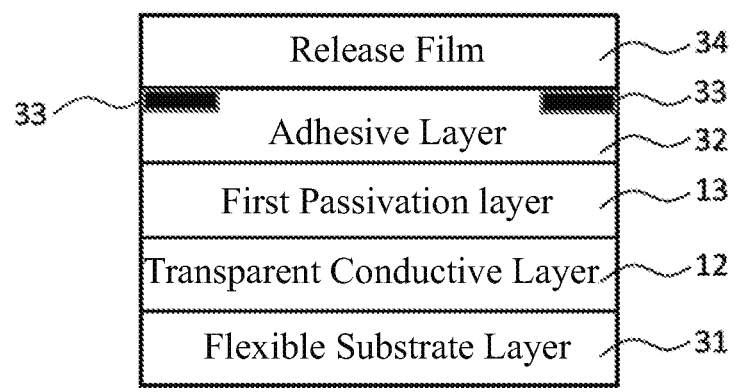
FIG. 5B depicts a schematic diagram of a structure of a planar heating structure 3 based on FIG. 5A according to another embodiment of this disclosure.

A description is provided with reference to FIG. 5B. FIG. 5B is another embodiment based on FIG. 5A. In the present embodiment, when electrodes are non-transparent or lack of light transmittance, wirings of the electrodes are clearly visible and affect the visual effect of the vehicle window. In order to cover the electrodes formed on two sides of the transparent conductive layer 12 or on sides, an ink layer 33 is disposed on an adhesive surface of the adhesive layer 32 and the window glass. Generally speaking, the ink layer 33 is distributed at positions where the electrodes are positioned so the ink layer 33 is only formed on the two sides or at edges of the transparent conductive layer 12 corresponding to the electrodes to increase the visibility of the planar heating structure.

Figure 6:
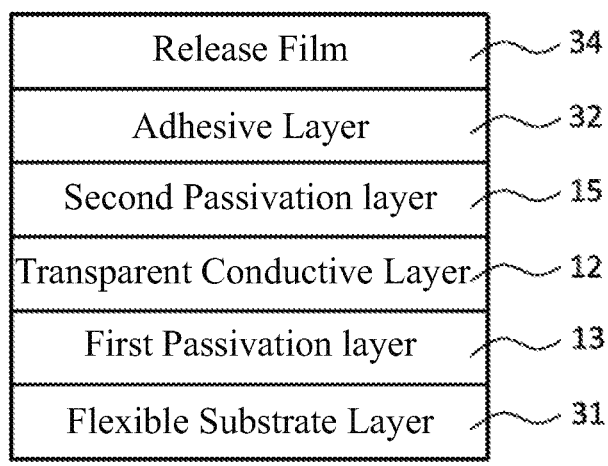
FIG. 6 depicts a schematic diagram of a structure of yet another planar heating structure 4 according to the this disclosure.

A description is provided with reference to FIG. 6. FIG. 6 depicts a structural diagram of yet another planar heating structure 4 according to the present disclosure. According to the present embodiment, the planar heating structure 4 comprises the flexible substrate layer 31, the transparent conductive layer 12, the adhesive layer 32, and the first passivation layer 13, and the second passivation layer 15 is added. It is noted that the second passivation layer 15 is disposed between the adhesive layer 32 and the transparent conductive layer 12 according to the present embodiment. The second passivation layer 15 is an optical functional layer having the anti-UV or/and anti-reflection abilities. The anti-UV function of the second passivation layer 15 reduces a total amount of UV light entering into the transparent conductive layer 12, thus extending the lifetime of the nano metal in the transparent conductive layer 12 and prolonging the period before entering into its deteriorated state. The anti-reflection function reduces the possibility of reflection of the transparent conductive layer 12 and the first passivation layer 13, thus increasing the overall transparency of the planar heating structure 4.

Figure 7:
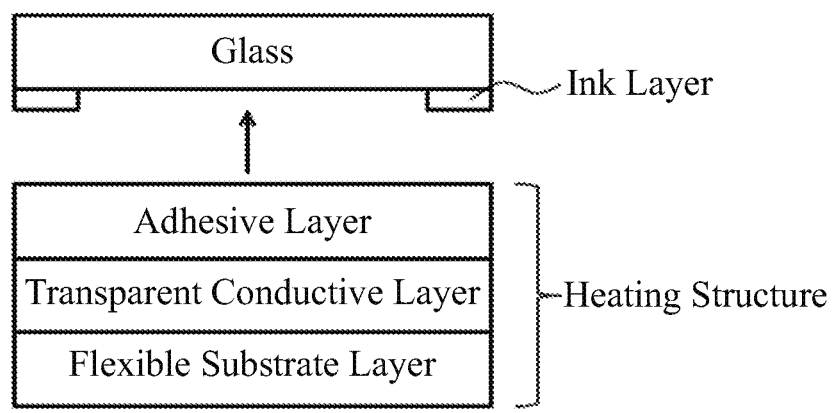
FIG. 7 depicts a schematic diagram of boning a heating structure to window glass according to another embodiment of this disclosure.

A description is provided with reference to FIG. 7. FIG. 7 depicts a schematic diagram of boning a heating structure to a vehicle window according to another embodiment of this disclosure. After the heating structure independent of window glass is manufactured, the heating structure is bonded to the vehicle window by utilizing an adhesive layer. As can be seen from the figure, an ink layer is formed on the vehicle window glass to cover electrodes that supply power to a transparent conductive structure.

In addition, in order to simplify the manufacturing processes to reduce the cost, particles or coating agents of an anti-reflection and/or anti-UV material may be mixed and coated in the transparent conductive layer 12 when the transparent conductive layer 12 is formed. Or, the particles or coating agents of the anti-reflection and/or anti-UV material may be mixed and coated in the adhesive layer 32 when the adhesive layer 32 is formed.

The planar heating structure 1 disclosed in the present application can achieve a condition where the transmittance is more than 85% and the haze is less than 3%. Because of its excellent transparency, it can be used in various transportation means, such as automobiles, ships, aircraft, etc. to remove fog or frost on the glass. In the application of vehicle window glass, in addition to the rear windshield, the planar heating structure 1 can be applied to other portions including the front windshield.

Although the present disclosure has been described in considerable detail with reference to certain embodiments thereof, other embodiments are possible. Therefore, the spirit and scope of the appended claims should not be limited to the description of the embodiments contained herein.

What is claimed is:

1. A planar heating structure, comprising:
a glass substrate layer;
a nanometallic transparent conductive layer having a plurality of metal nanowires disposed on the glass substrate layer and receiving electrical energy to convert the electrical energy into heat energy, wherein more than 92% of the metal nanowires have a length greater than 5 μm;
a first passivation layer disposed on the nanometallic transparent conductive layer and completely covering the nanometallic transparent conductive layer, wherein a thermal conductivity of the first passivation layer is lower than that of the glass substrate layer so that most of the heat energy converted from the electrical energy is discharged from the glass substrate layer in a conductive manner or a radiating manner; and
two electrodes located on two opposite sides of the planar heating structure having a shortest relative distance, a voltage being applied between the two electrodes,
wherein, when the voltage is substantially 40 volts and when per square centimeter of a surface the planar heating structure consumes a power of 0.07 W, the planar heating structure has a temperature rise of 12° C.±1° C. within 2 minutes.

2. The planar heating structure of claim 1, wherein an aspect ratio of the metal nanowires is between 10 and 100.

3. The planar heating structure of claim 1, wherein a threshold surface loading level of the nanometallic transparent conductive layer is between 0.05 μg/cm$^2$ and 10 μg/cm$^2$.

4. The planar heating structure of claim 1, wherein the planar heating structure satisfies a condition where a transmittance is more than 85% and haze is less than 3%.

5. The planar heating structure of claim 1, wherein the first passivation layer has any of the following compounds and combinations thereof: a small organic molecule having a molecular weight of not more than 500, an oligomer having 2 to 100 monomers, or a polymer having more than 100 monomers, any of the compounds having a boiling point not lower than 150° C.

6. The planar heating structure of claim 1, wherein the nanometallic transparent conductive layer further comprises a matrix layer, the matrix layer is disposed on the glass substrate layer to allow the metal nanowires to adhere, a thickness of the matrix layer is from 10 nm to 5 μm, a refractive index of the matrix layer is between 1.3 and 2.5.

7. The planar heating structure of claim 1, a cross-sectional area of the nanometallic transparent conductive layer adjacent to the two electrodes is smaller than the cross-sectional area of the nanometallic transparent conductive layer far away from the two electrodes.

8. The planar heating structure of claim 1, wherein the metal nanowires form any of the following pattern layers and combinations thereof: a dot, a polygon, interlaced lines, a concentric circle, or a circle-like arrangement.

9. The planar heating structure of claim 5, wherein the compound comprised in the first passivation layer is any of the following and combinations thereof: a rhodium salt, zinc, or a cadmium salt.

10. The planar heating structure of claim 5, wherein the compound comprised in the first passivation layer is any of the following and combinations thereof: a sodium ascorbic salt, a potassium ascorbic salt, or an ascorbic acid.

11. The planar heating structure of claim 1, further comprising:
a second passivation layer disposed between the glass substrate layer and the nanometallic transparent conductive layer, wherein the second passivation layer has any of the following compounds and combinations thereof: a small organic molecule having a molecular weight of not more than 500, an oligomer having 2 to 100 monomers, or a polymer having more than 100 monomers, any of the compounds having a boiling point not lower than 150° C.

12. The planar heating structure of claim 11, wherein the compound comprised in the second passivation layer is any of the following and combinations thereof: a rhodium salt, zinc, a cadmium salt, a sodium ascorbic salt, a potassium ascorbic salt, or an ascorbic acid.

13. The planar heating structure of claim 7, further comprising:
an ink layer formed on a surface of the glass substrate layer close to the nanometallic transparent conductive layer, the ink layer covering the two electrodes to avoid visual interferences.

14. The planar heating structure of claim 1, wherein the first passivation layer is directly formed or is bonded through an adhesive layer to a surface of the nanometallic transparent conductive layer away from the glass substrate layer.

15. The planar heating structure of claim 1, further comprising:
an optical functional layer disposed between the glass substrate layer and the nanometallic transparent conductive layer.

16. The planar heating structure of claim 1, wherein the nanometallic transparent conductive layer comprises particles or coating agents of at least one of an anti-reflection material or an anti-ultraviolet (UV) material.

17. The planar heating structure of claim 1, further comprising:
a reinforcement adhesive formed on at least one outer side of the planar heating structure and at least encapsulating one side of the glass substrate layer, the nanometallic transparent conductive layer, and the first passivation layer.

18. The planar heating structure of claim 17, wherein the reinforcement adhesive is formed through solidification of a liquid adhesive by way of a curing process.

19. A planar heating structure for bonding to glass, comprising:
a flexible substrate layer;
a nanometallic transparent conductive layer having a plurality of metal nanowires disposed on the flexible substrate layer and receiving electrical energy to convert the electrical energy into heat energy, wherein more than 92% of the metal nanowires have a length greater than 5 µm;
an adhesive layer disposed on the nanometallic transparent conductive layer;
a release film formed on a surface of the adhesive layer away from the nanometallic transparent conductive layer;
a first passivation layer disposed on the nanometallic transparent conductive layer and completely covering the nanometallic transparent conductive layer, wherein a thermal conductivity of the first passivation layer is lower than that of the flexible substrate layer so that most of the heat energy converted from the electrical energy is discharged from the flexible substrate layer in a conductive manner or a radiating manner; and
two electrodes located on two opposite sides of the planar heating structure having a shortest relative distance, a voltage being applied between the two electrodes,
wherein, when the voltage is substantially 40 volts and when per square centimeter of a surface the planar heating structure consumes a power of 0.07 W, the planar heating structure has a temperature rise of 12° C.±1° C. within 2 minutes.

20. The planar heating structure of claim 19, wherein the flexible substrate layer is any of the following material and combinations thereof: polypropylene (PP), polyethylene (PE), polystyrene (PS), polymethyl methacrylate (PMMA), polycarbonate (PC), polyethylene terephthalate (PET), polyvinyl chloride (PVC), polyimide (PI), or polyurethane (PU).

* * * * *